(12) United States Patent
Hemstreet et al.

(10) Patent No.: US 6,931,447 B1
(45) Date of Patent: Aug. 16, 2005

(54) REMOTE HARD COPY APPARATUS CONTROL INCLUDING FIREWALL PENETRATING PROTOCOLS

(75) Inventors: Charles H. Hemstreet, Vancouver, WA (US); Avinash Chakravarthy, Hillsboro, OR (US); Petar Obradovic, Vancouver, WA (US); Craig A. Osborne, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 968 days.

(21) Appl. No.: 09/671,556

(22) Filed: Sep. 27, 2000

(51) Int. Cl.$^7$ .............................................. G06F 15/16
(52) U.S. Cl. ...................................... 709/227; 713/154
(58) Field of Search ............................... 713/154, 193; 709/227, 203

(56) References Cited

U.S. PATENT DOCUMENTS

| | | | |
|---|---|---|---|
| 5,220,674 A | * 6/1993 | Morgan et al. | 709/223 |
| 5,946,458 A | * 8/1999 | Austin et al. | 358/1.15 |
| 5,974,234 A | * 10/1999 | Levine et al. | 358/1.16 |
| 5,999,707 A | * 12/1999 | Taniguchi et al. | 358/1.15 |
| 6,012,083 A | * 1/2000 | Savitzky et al. | 709/202 |

* cited by examiner

Primary Examiner—Gregory Morse
Assistant Examiner—Thomas Ho (57) ABSTRACT

A server implementation adapted for use with a computer peripheral having a plurality of reportable operational states. In an exemplary embodiment for a hard copy apparatus, both internet browser and electronic mail clients are provided with access to and control of the apparatus. Data filtering and handling are provided for discriminating specific data communications. Firewall penetrating protocols are provided.

27 Claims, 9 Drawing Sheets

REMOTE HARD COPY APPARATUS CONTROL INCLUDING FIREWALL PENETRATING PROTOCOLS

BACKGROUND OF THE INVENTION

1. Field of the Invention the present invention relates generally to a networked computer peripheral apparatus, such as a hard copy apparatus, and more particularly to communicating apparatus control, diagnostics, and status information, through a network firewall.

2. Glossary

The following terms and acronyms may be used throughout this document and appendices, if any; there definitions are provided for the convenience of the reader; however, no limitation on the scope of the invention should be implied herefrom.

"Client-Server": A model of interaction in a distributed computer network system in which a program at one site sends a request to another site and then waits for a response. The requesting program is called the "client," and the program which responds to the request is called the "server." In the context of the World Wide Web ("www" or "web" defined hereinafter), the client is a "browser;" i.e., a program which runs on a computer of an end-user.

A program and network computer which responds to a browser request by serving web pages and the like, is referred to as a "server." Specialized servers, such as dedicated electronic mail (defined hereinafter) servers are also known in the art.

"Common Gateway Interface" ("CGI"): A way of interfacing computer programs with HTTP (defined hereinafter) or web servers so that a server can offer interactive sites instead of just static text and images. "CGI script" is a program that is run on a web server in response to input from a browser. The CGI script is the link between the server and a program running on the system; for example, a database. CGI scripts are used with interactive forms.

"Cookies": a technology that enables a web server to retrieve informational items from an end user's computer that reveals prior browsing activities of the user; the informational item is stored on the user's computer by a server, typically on the computer's hard drive.

"Electronic Mail" ("e-mail"): The process and software for sending and receiving of textual information and attachments thereto between end-users over a distributed computer network such as the internet; internet access providers often include e-mail service to its customers as part of the access software that allows the end user to dial into the internet.

"Firewall": an electronic boundary that prevents unauthorized users from accessing certain files on a network, or a computer used to maintain such a boundary; or a generic term for any program used to secure a network from such public access.

"Hyperlink": An internet navigational link from about document or web page to another, or from one portion or component of a document or web page to another. Typically, a hyperlink is displayed as a highlighted word or phrase on a web page that can be selected by clicking a mouse screen pointer thereon, resulting in a jump to the associated document or portion.

"Hypertext System": A computer-based informational system in which documents or other types of data, are linked together via hyperlinks to form a user-navigable web of network or internet sites.

"Internet": A generic term for a collection of distributed, interconnected networks (ARPANET, DARPANET, World Wide Web, or the like) that are linked together by a set of industry standard protocols (e.g., TCP/IP, HTTP, UDP (defined hereinafter), and the like) to form a global, distributed network.

"Header": A data string defining the attributes such as size, data format, and the like, of an attached message.

"Hypertext Mark-up Language" ("HTML"): A standard coding convention and set of codes for attaching presentation and linking attributes to informational content within documents; the primary standard used for generating web documents. During a document authorizing stage, the HTML codes (referred to as "tags") are embedded within the informational content of the document; when the document is subsequently transferred from a server to a client, the codes are interpreted by the browser and used to parse and display the document. In specifying how the browser is to display the document, HTML tags can be used to create hyperlinks to other webs documents.

"HyperText Transport Protocol" ("HTTP"): The standard www client-server protocol used for the exchange of information such as HTML documents and client requests for such documents between a browser and the server. HTTP includes a number of different types of messages which can be sent from the client to the server to request different types of server actions. For example, a "get" message which has the format GET<URL> (defined hereinafter) causes the server to return the document or file located at the specified URL.

"IP" is the standard acronym for "internet protocol."

"Messaging Application Programming Interface" ("MAPI"): A program interface that enables a user to send and receive e-mail from within any MAPI-compliant application by means of the Microsoft™ Mail messaging system. If two applications are MAPI-enabled, they can share e-mail messages with each other. Applications that can use MAPI include word processors, spreadsheets, and graphic applications.

"Microsoft COM" ("COM"): a public standard for binary interface communications.

"PULL": A technology, commonly used as the basis for web communications, in which the client browser must request a specific web page, such as by a hyperlink, before it is sent by a server.

"PUSH": A technology for information dissemination used by a server to send data to users over a network. PUSH protocols send the informational content to the end user computer, or client, automatically, typically based on information pre-specified by the user.

"Simple Mail Transmission Protocol" ("SMTP"): An internet standard for text only transmission commonly known as "e-mail."

"Transmission Control Protocol/Internet Protocol" ("TCP/IP"): A communications protocol developed for the internet to get data from one network device to another; uses a retransmission strategy to ensure that data will not be lost in transmission.

"User Datagram Protocol" ("UDP"): A communications protocol for the internet network layer, transport layer, and session layer, which makes it possible to send a datagram message from one computer to an application running in another computer; used in conjunction with IP.

"Uniform Resource Locator" ("URL"): A unique address which fully specifies the location of a file or other resource on the internet. The general format of a URL to is protocol://
machine address.port/path/filename. The port specification
is optional, and if none is entered by the user, the browser
defaults to the standard port for whatever service is specified
as the protocol. For example, if HTTP is specified as the
protocol, the browser will use the HTTP default port;
<HTTP:/WWW.HP.COM> is a URL, where postfix ".COM"
is a commercial entity, ".EDU" is an educational entity,
".GOV" is a government entity, and ".ORG" is a non-profit
organization. Hyperlinks are often URL designations.

"Web Site": A computer system that servers informational
content over a network using standard protocols of the web.
Typically, a web site corresponds to a particular internet
domain name, such as HP.COM", and includes the content
associated with a particular organization such as Hewlett-
Packard Company. The term is generally intended to encompass both (1) the hardware/software server components that
serve the informational content over the network, and (2) the
"back-end" hardware-software components, including any
non-standard or specialized components that interact with
the server component to perform service for web site users.

"World Wide Web ("web")": Refers generally to both (1)
a distributed collection of interlinked, user-viewable hypertext documents ("web documents" or "web pages") that are
accessible via the internet, and (2) the client and server
software components which provide user access to such
documents using standardized internet protocols. Currently,
the primary standard protocol for allowing applications to
locate and acquire web documents is HTTP, and the web
pages are encoded using HTML. However, the terms "web"
and world wide web" as used herein are intended to encompass future mark-up languages and transport protocols
which may be used.

3. Description of the Related Art

Remote use of a computer peripheral, such as an exemplary hard copy apparatus peripheral (hereinafter "printer"),
may be desired, for example, to print a report for local
employees at a remote office location. A key element for any
printer to be reliable is that it also be easily serviceable.
Therefore, another example of remote control or use would
be to access the printer logic for performance of diagnostics
or actual maintenance. It is also important to know when
user and device problems occur, like the user leaving the
printer off-line or low ink levels in pens. Thus, it is becoming
increasingly important for information technology administrators to have access to a remote printer.

Using common communication protocols, like TCP/IP or
UDP, would require the opening of a particular port through
which the printer would communicate with a client outside
a firewall. This is a procedure that a network system
administrator would not likely accept due to the increased
security risk to the network behind the firewall.

One method of obtaining such access is disclosed by
Nelson in U.S. patent application Ser. No. 09/299,832, filed
Apr. 26, 1999 for REVERSE HTTP CONNECTIONS FOR
DEVICE MANAGEMENT OUTSIDE A FIREWALL
(assigned to the common assignee herein). Nelson teaches a
method for enabling a remote processor to control a device
coupled to a local processor, where the local processor is
coupled to a computer network and a firewall is operatively
interposed between the local processor and the computer
network. The firewall routes messages from the local processor to the computer network, and only when authorized,
routes messages from the computer network to the local
processor. The local processor initiates communication with
the remote processor, authorizes the firewall to pass a
message from the remote processor to the local processor,
and executes commands to manage the device as indicated
in the message from the remote processor. The exchange of
messages is continued when the message from the remote
processor directs the local processor to send a next message
to the remote processor. A reverse HTTP connection is
established when the messages received from the remote
processor are requests, and the messages sent to the remote
processor are responses.

Another application assigned to the common assignee
herein was filed on Nov. 5, 1999, by Obert Jr. et al. for an
E-MAIL-BASED REMOTE DIAGNOSTIC FACILITY.
That invention is utilized in the context of a peripheral
device that is coupled to a network via a firewall which
blocks unwanted incoming message traffic, except for e-mail
message traffic. A remotely located diagnostic device, which
includes code for diagnosis of causes of peripheral device
malfunctions, is connected to communicate via the network.
The peripheral device includes a processor for controlling its
operation, a memory for storing a diagnostic application that
is adapted to execute one or more diagnostic subroutines for
diagnosing a cause of a device malfunction. The peripheral
device dispatches an event e-mail message that reports an
anomaly or malfunction to the remote diagnostic device and
receives a response e-mail message from the remote diagnostic device (all via the firewall and the network). The
response e-mail message is transmitted to the peripheral
device which, in-turn, causes the diagnostic application to
execute a subroutine in an attempt to determine the cause of
the event. In the case where the remote diagnostic device is
adapted to download an executable diagnostic subroutine via
an e-mail message, the peripheral device receives the subroutine and executes it.

There is a need for a widely accepted and understood
mode of communication such as direct web-based or e-mail-
based remote status notification and computer peripheral
maintenance and control, such as for a networked hard copy
apparatus.

SUMMARY OF THE INVENTION

In its basic aspects, the present invention provides a server
for hard copy apparatus control including: mechanisms for
connecting the apparatus to a network; mechanisms for
deciphering messages received via said means for connecting based on data type and content; mechanisms for routing
deciphered messages received via said mechanisms for
deciphering such that specific tasks associated with hard
copy apparatus control are discriminatively routed; and
mechanisms for respectively receiving discriminatively
routed messages and for executing said tasks.

In another aspect, the present invention provides a hard
copy apparatus, having printing mechanisms which have
reportable operational state conditions, including: an embedded server further including computer code for providing
internet interface; associated with said computer code for
providing internet interface, computer code for discriminating types of HTML data received via said means for
providing internet interface; computer code for handling
incoming electronic mail and outgoing electronic mail;
associated with said computer code for discriminating and
said computer code for handling incoming electronic mail
and outgoing electronic mail, computer code for routing data
from said code for discriminating types of HTML data and
said code for handling incoming electronic mail and outgoing electronic mail; and associated with said computer code
for routing, computer code for processing data routed by said code for routing data such that the hard copy apparatus printing mechanisms can be controlled and said reportable operational state conditions can be monitored via either said internet interface or said electronic mail.

In another aspect, the present invention provides a method for operating a computer peripheral apparatus protected by a network firewall, including the steps of: providing the apparatus with a server interface; storing predetermined subsets of operational parameters of the apparatus wherein each subset is related to a remote client having access to the server interface; and upon a change of operational parameter state of said apparatus, determining if the change is associated with any said subset and sending an electronic message via said server interface to each client associated with said subset wherein the message content includes notification of the change of operational parameter state.

In another aspect, the present invention provides a process for communicating hard copy apparatus printing mechanisms reportable operational states over internet pathways wherein the apparatus is protected by a firewall, including the steps of: coupling the apparatus to the internet pathways via a server having both web server interface and electronic mail interface between the printing mechanisms; communicating from a client to the server either via a web page provided by the server to the client having predetermined permissible data entry or via electronic mail having predetermined permissible data entry, wherein said predetermined permissible data entry is limited such that non-conforming data can not penetrate said firewall.

In another aspect, the present invention provides a hard copy apparatus server including: mechanisms for abstracting operational state parameters of at least one hard copy apparatus associated with said server; and mechanisms for communicating with said mechanisms for abstracting and said at least one hard copy apparatus via the internet using predetermined firewall penetrating protocols, wherein a plurality of clients outside of said firewall can communicate substantially simultaneously with the at least one apparatus.

Some of the advantages of the present invention are:

it provides a plurality of solutions for a network interface to a hard copy apparatus or other computer peripherals which have multiple operational state conditions;

it provides access to computer apparatus behind a firewall; and it provides a method and apparatus for computer peripheral device configuration control, status queries, diagnostics operations, and executing operational function control.

The foregoing summary and list of advantages is not intended by the inventors to be an inclusive list of all the aspects, objects, advantages, or features of the present invention not should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the basic nature of the invention in order to be of assistance in aiding ready understanding of the patent in future searches. Other aspects, objects, advantages, and features of the present invention will become apparent upon consideration of the following explanation and the accompanying drawings, in which like reference designations represent like features throughout the drawings.

DESCRIPTION OF THE PRESENT INVENTION

Reference is made now in detail to a specific embodiment of the present invention which illustrates the best mode presently contemplated by the inventors for practicing the invention. Alternative embodiments are also briefly described as applicable.

Figure 1A:
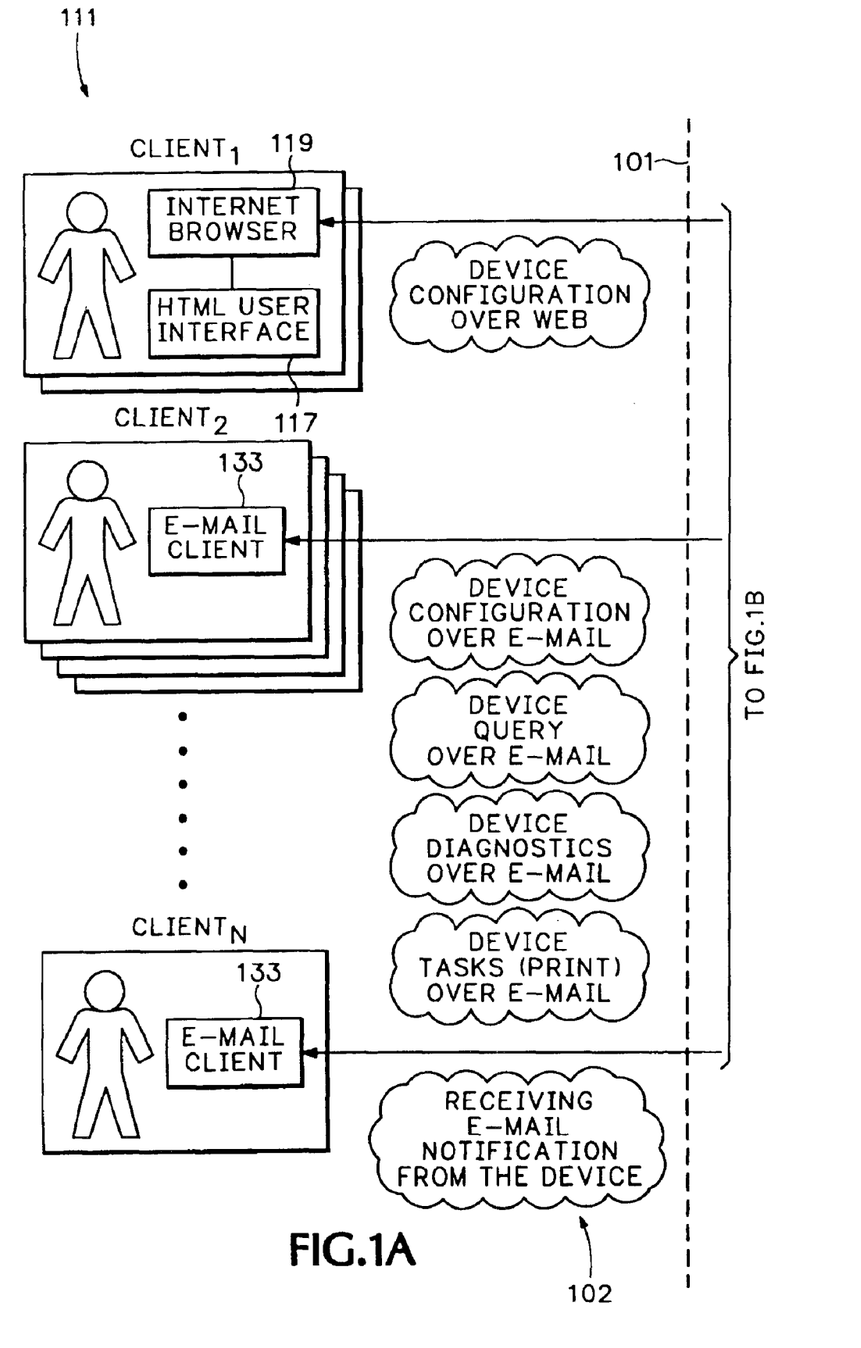
FIG. 1 is a block diagram depicting a system in accordance with the present invention.
Figure 1B:
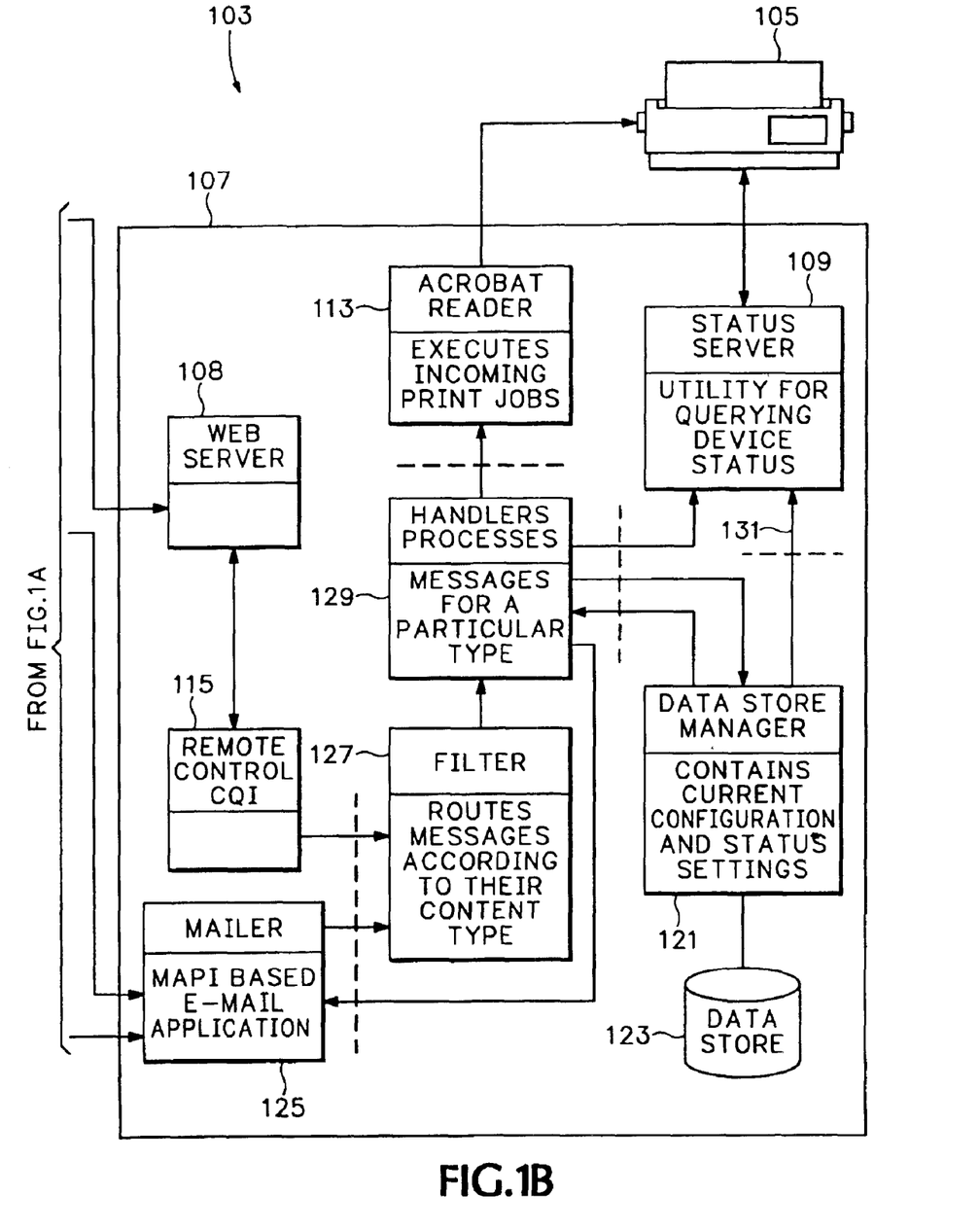

FIG. 1 is a system block diagram. Let jagged-line 101 represent a firewall 101 protecting a network 103 to the right side of the FIGURE which includes a printer 105 having an embedded Server 107.

A plurality of Clients $111_N$ are outside the firewall 101. Connections to the network 103 via the firewall 101 are represented by arrows labeled via generic balloon messages representative of internet, or web, 102 data flow. Individual process boundaries within the Server 107 are represented by dashed lines. In this exemplary embodiment, the printer 105 in the exemplary embodiment of FIG. 1 is an "intelligent" web peripheral. While only one printer 105 is shown, it should be recognized that a plurality of apparatus will likely be part of the network 103. The present invention in its preferred embodiment is employed in this "smart," or "intelligent," printer which would include the necessary server and internet subsystems such that it resides on a direct connection to the web 102. It should be recognized that in the spirit of the invention, simple, off-the-shelf, computer printers, such as the HP™ LaserJet™ printer or HP™ JetDirect™ enabled DeskJet™ printer, can be connected inside the firewall 101 via a separate, dedicated server such as that described as the preferred embodiment hereinafter.

It is well known that a web-based (i.e., using a browser) Client 111 set, comprising $Clients_1$ of FIG. 1, can not penetrate the firewall to obtain access to the printer 105. In order to gain such access, printer-embedded Server 107 programming in accordance with the present invention is provided with a plurality of subcomponents now described. (Subtitles used hereinafter are merely for the convenience of the reader; no limitation on the scope of the invention is intended nor should any be implied therefrom.)

Web Server 108

The Server 107 system includes a commercially available Web Server 108 interface application component, such as Apache WEB Server™ software (a commercial program which might be run in the alternative on, for example, an HP™ E60 NetServer computer). Such products are well known in the art and no further detail is required for an understanding of the present invention.

Status Server 109

In general, the Status Server 109 component is a server application using PML language that abstracts the devices operations and connections thereto for one or more physical printers 104, allowing one or more remote Clients 111 to determine the status of features thereof. In the context of the present invention, the Status Server 109 component provides a portal having data representing each printer 105 operational state in a client-server model. In the main, the Status Server 109 component transposes device specific language, e.g. HP-PML formatted device driver, into a PML language for use by the other Server 107 components. In essence, it is an analogous to a multiplexer for permitting and managing data for a plurality of local clients to communicate with the same printer without having to resort to Microsoft COM programming. It does not however permit cross-firewall printer management in and of itself (note process boundary 131).

Further, extensive detail regarding a specific preferred embodiment of the status Server 109 is set forth in U.S. patent application Ser. No. 09/676,385, attorney docket no. 10003389, by Osborne et al. and assigned to the common assignee herein, for a ASYNCHROUNOUS DEVICE STATUS VIA A BROWSER USING A SERVER PUSH TECHNIQUE, but is not necessary for a complete understanding of the present invention.

Print Job Subroutines 113

A print job program 113, such as commercially available Acrobat™ Reader™ software, is coupled to the printer I/O and used to execute incoming print jobs.

Diagnostics Interface Components 115, 117 ("RCCGI")

Figure 2:
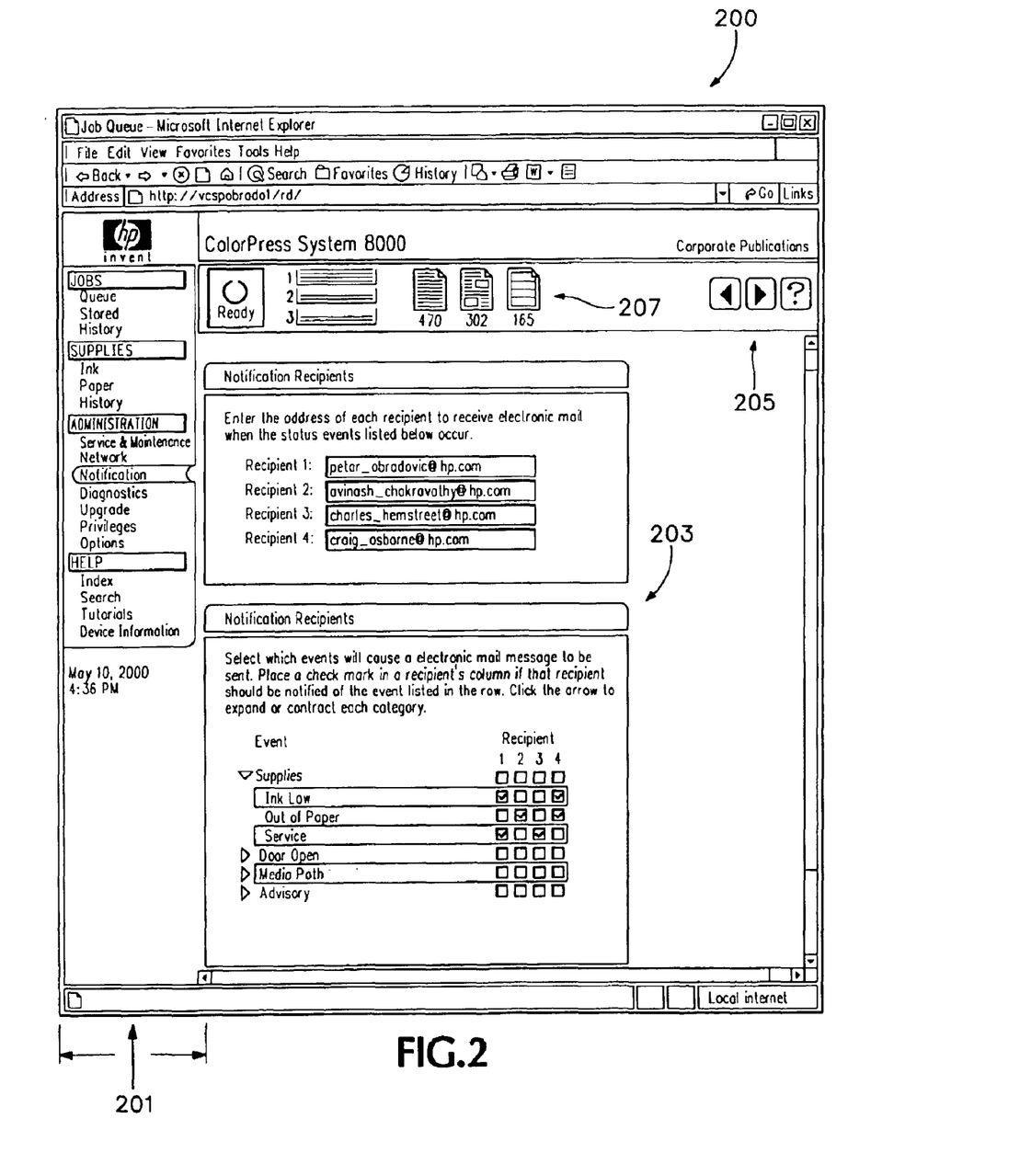
FIG. 2 is an exemplary web page typifying an interactive browser form in accordance with the present invention as shown in FIG. 1.

A Remote Control 115 component is interfaced with the Web Server 108. The specific diagnostic subroutines are of course specific to the actual printer(s) 105 employed in the network 103 which are to be maintained accordingly. The Remote Control 115 components also provides a CGI component between the web 102 via the Web Server 108. Its main function is to generate requested HTML pages dynamically from provided predetermined templates on-board and to process user input from these pages. An exemplary web page 201 is shown in FIG. 2. Included in the Remote Control 115 CGI component are interactive pages from the templates that enable users to specify e-mail server settings and to configure notification events. These pages further give the Clients 111 the ability to specify new configurations for the Remote Control 115 subroutines. These new configurations are submitted for processing such that the diagnostic subroutines employed can do the actual reconfiguration. The Remote Control 115 components is implemented in C++ programming language as would be known in the art. It resides in a directory that has Web Server 108 execute rights on the front-end so that it can be invoked as a CGI script. When invoked, the Remote Control 115 components runs in the Web Server's process space. On the back-end, the Remote Control 115 components communicates (via known manner filtering and handling techniques) with data storage subsystems, described hereinafter.

An HTML User Interface 117 components is downloaded via an Internet Browser 119 (such as commercially available Microsoft™ Explorer™ software) to each web-based client (e.g., Client 1) upon request. The User Interface 117 component in a known manner provides links on a web site that lead to web pages point to the Remote Diagnostic 115 component. Links also contain page identifiers that are used by the Remote Control 115 component to determine which specific page is to be generated dynamically. The Remote Control 115 component loads the HTML file containing the template for the requested HTML page and merges it with current settings of the diagnostics subsystem in storage which results in an HTML page containing current settings that is returned to Client 1. Using generated HTML pages such as shown in FIG. 2, selecting (by a mouse click or equivalent on) administration/Diagnostics, the user can review and modify remote diagnostic settings to get specific status reports. After modifications are made, the page is submitted back to the Remote Control 115 component for processing, viz., extracting new settings and passing them to data storage.

Data Storage Management 121

A Data Storage Manager (DSM) 121 component provides a nexus through which transactions are routed. The DSM 121 component is coupled to a known manner memory 123 device. The DSM 121 component is a COM executable server program used to save and retrieve e-mail and printer status notification settings. The DSM 121 component further provides the subroutines for registering with the Status Server 109 component for predetermined printer status notification events; when an event occurs, the Status Server call back into the DSM which then takes appropriate action pursuant to Client registration configurations. In other words, whenever an event occurs, the DSM 121 component initializes an e-mail component described hereinafter (see Mailer description) to send appropriate e-mail to all subscriber Clients of that event.

Figure 3:
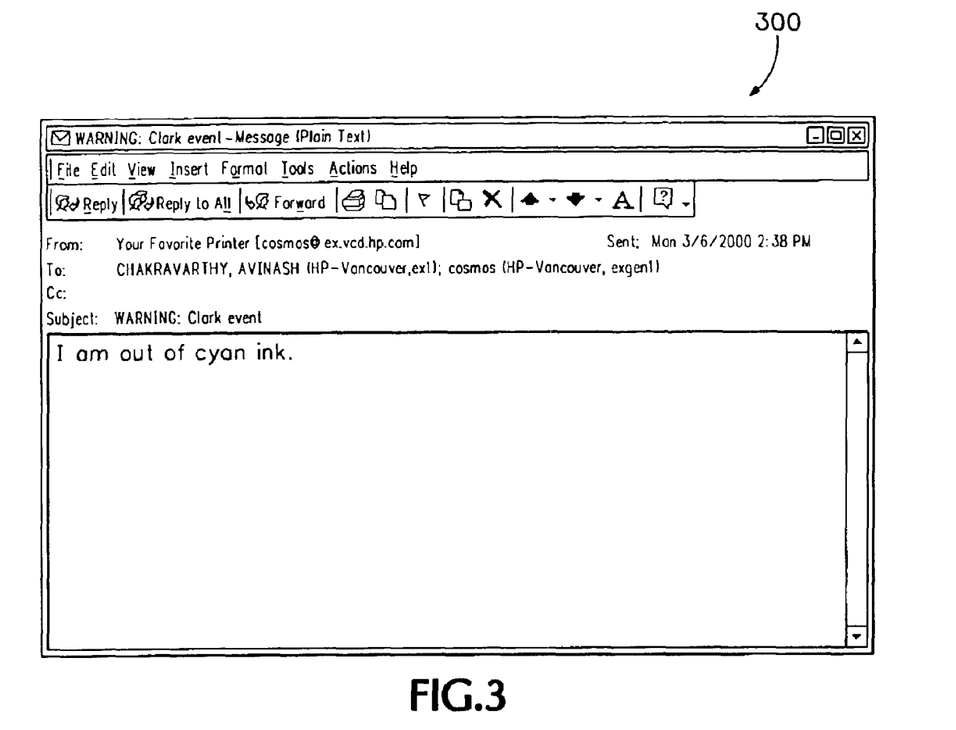
FIG. 3 is an exemplary e-mail message typifying a system dispatch to a client in accordance with the present invention as shown in FIG. 1.

In operation, when a Client sends requests, the DSM 121 component interprets the data sent and registers for certain events with the Status Server 109. The Status Server 109 component in turn notifies the DSM 121 component of any printer status event. For example, if Client 2 has requested via a prior subscription to be notified on any out-of-ink event, the DSM 121 component registers this event with the Status Server 109 component. Whenever this event occurs at the printer 105, the Status Server 109 component calls and notifies the DSM 121 component. In turn, the DSM 121 component calls the e-mail component described hereinafter, instructing the sending of an e-mail message to Client 2 (and all other subscribing e-mail Clients) notifying Client 2 that the event has occurred. An exemplary e-mail message is illustrated in FIG. 3.

Electronic Mail Handler ("EMH" or "Mailer") 125

An EMH 125 components is provided having two main functions, sending and receiving e-mail. The EMH 125 components is a MAPI-based e-mail application that is associated with a commercial mail server program, such as Microsoft™ Outlook™ products. Based on known manner timer events, the EMH 125 components polls the mail server for incoming messages from subscribing Clients$_{2-N}$. The EMH 125 component dispatches nay received mail via a known manner parser which deciphers the message and takes appropriate forwarding action. A parser is a known manner subroutine for interfacing a Mailer and a data storage manager, generally using e-mail FROM, SUBJECT, and MESSAGE fields. The EMH 125 component is invoked by the DSM to send an e-mail to subscribed Clients based upon printer 105 status changes noted in the Status Server 109 component. In essence, the Mailer is a COM executable server component.

A client 111 can have the printer 105 perform tasks via an e-mail message. A format can be tailored for a specific printer model. In the exemplary embodiment of FIG. 1, four Client 111 outgoing e-mail tasks are shown:

(1) "Device configuration over e-mail"
(2) "Device query over e-mail"
(3) "Device diagnostics over e-mail" and
(4) "Device tasks (print) over e-mail".

It will be recognized by those skilled in the art that such "tasks" can be expanded or change to fit a particular implementation.

Based on the Client 111 outgoing e-mail content received by the EMH 125 component and forwarded to the Filter 127 component (described hereinafer) and the Handlers 129 component (described hereinafter) appropriately such that the specific task is implemented. For example, a message having a print message, (4) "Device tasks (print) over e-mail", and an Acrobat-formatted attachment, is filtered and handed-off to the Acrobat Reader 113 component, then printed out.

Filter

The Filter 127 component is associated integrally with the EMH 125 component, interfacing the EMH, the Remote Control 115 component, and the Handlers 129 component described hereinafter. The Filter 127 component provides message content analysis for the EMH 125 component and the Remote Control 115 component, routing the message to the appropriate handling subroutine. For example, an e-mail message containing a device query is sent by a Client and is received into the EMH 125 component. The Filter 127 component examines the contents and forwards it to a query handler subroutine which executes the query to the DSM 121 component to obtain the current status related to the query. Or, for example, an e-mail message from a Client contains an Adobe Acrobat formatted document as an attachment for printing. The EMH 125 component receives the messages, the Filter 127 component examines the content and passes it to the Acrobat Reader 113 component via an appropriate Handler subroutine as described hereinafter which forwards it to the printing queue.

Handlers 129

The Handlers 129 component receives filtered e-mail messages and provides the appropriate interaction with the rest of the system by examining the content described by an associated header of the message and acting on it. For example, one handler subroutine is built to direct Adobe Acrobat formatted files to the Acrobat Reader 113 component for printing; another handle subroutine is built to interact with the DSM 121 component, querying for printer status and outputting a predetermined e-mail message via the DSM component and Mailer 125 component to the Client requesting the status.

Exemplary Operations

The flow charts of FIGS. 4A–4F illustrate operations in accordance with the present invention. Looking specifically to FIG. 4A in conjunction with FIG. 1, assume a Client having downloaded the HTML User Interface 117 component and having the web address of the printer 105 is interested in the status of the printer 105 either for printing thereon or system administration, e.g., keeping adequately loaded pens installed. Prior to sending a print job or as part of administrative duties, the Client decides to check the status of the printer 105.

HTML User Interface 117 Operations

Figure 4A:
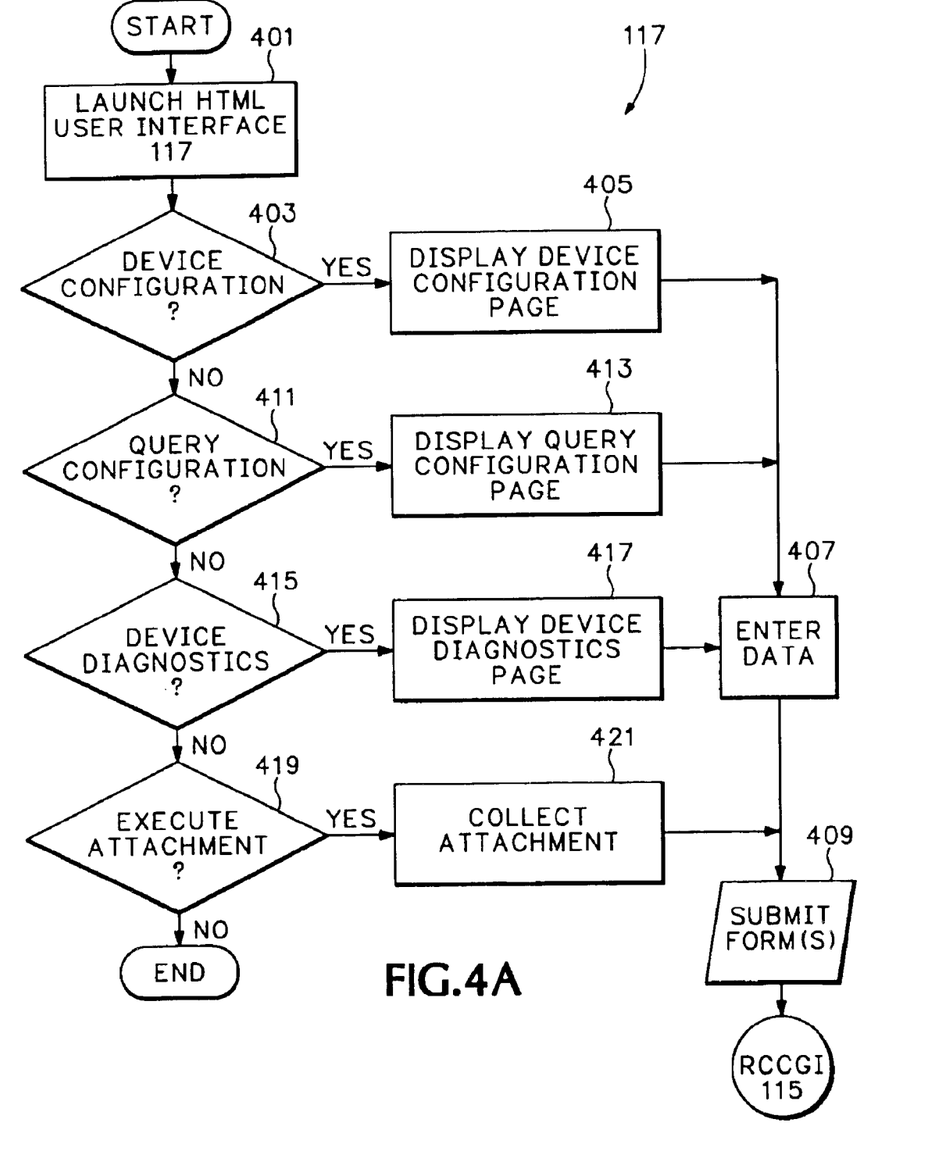
FIGS. 4A–4F are flow charts illustration operations in accordance with the present invention as shown in FIG. 1.

FIG. 4A is a flow chart of operations associated with the HTML User Interface 117 component that resides on a Client's 111 machine as illustrated in FIG. 1 (reference to both FIGURES is advisable for purpose of understanding the following operations in accordance with the present invention). As described hereinbefore, the HTML User Interface 117 is a program made available, such as in web downloadable form, to Clients 111 who are to have access to the printer 105. It will be recognized by those skilled in the art that like any user interface, the HTML User Interface 117 component can be tailored to specific tasks; exemplary preferred embodiment tasks are described herein. Using FIG. 2 as an exemplary, launched, on-line view, web page, the categories of interest regarding a printer 105 are categorized (left column 201) as:

"JOBS"
"SUPPLIES,"
"ADMINISTRATION" AND
"HELP."

Specific tasks which the Client can perform, such as "Queue" . . . "Ink". . . "Services & Maintenance" . . . "Index" . . . and the like are provided as click-on mouse button selections.

The HTML User Interface 117 component is launched, step 401, by the Client 111 whenever a task involving the printer 105 is to be performed. A preliminary task of the end-user or a system administrator is to register the Clients 111 who are allowed access to the printer 105, step 403, YES-path Selecting (mouse click) "Notification" in the task column 201 displays at least one device configuration page, 405, typified by region 203 in FIG. 2. In this embodiment, a plurality of user's, "Recipient 1 . . . 4," are shown, each having an individual internet addresses and each has a checked-off preference regarding specific events regarding printer "Supplies" (e.g., ink and paper supplies currently on-board), "Service" (e.g., a door open), and "Media Path" (e.g., paper jams). The data is appropriately entered, step 407, and when all required data fields are complemented, the forms are sent to the server 107, specifically the RCCGI 115 component via the Web Server 108 interface. Forward, Back, and Help (or "?") mouse click-on buttons 205 are provided to allow the user/administrator to step through the various pages, filling out the provided forms.

Similarly, steps 411, YES-path, 413, 407, and 409 represent a sequential operation for a user/administrator to determine printer 105 current operational characteristics. The banner region 207 of the web page 200 in FIG. 2 typifies a display format that would be upgraded with the current information regarding printer 105. In this example, in the banner region 207, using graphical depictions, shows that the printer "light" graphic indicates the printer is "ready," paper tray "1" is full but paper trays "2" and "3" are low, and that there are three jobs in the queue—a black and white text job ("470" pages), a partial color/partial text job ("302" pages), and a full color job ("155" pages).

Similarly, steps 415, 417, 407 and 409 represent a sequential operation for "Diagnostics" page review and data entry which is invoked when a Client 111 selects "ADMINISTRATION" and "Diagnostics" from the task column 201 buttons.

In like manner via the JOBS tasks, steps 419, 421, 409, provision is made for the Client 111 to send a print job to the printer 105 queue via, as shown in FIG. 1, the Web Server 108, RCCGI 115, Filter 127, Handlers 129, Acrobat Reader 113 components path.

RCCGI 115 Operations

Figure 4B:
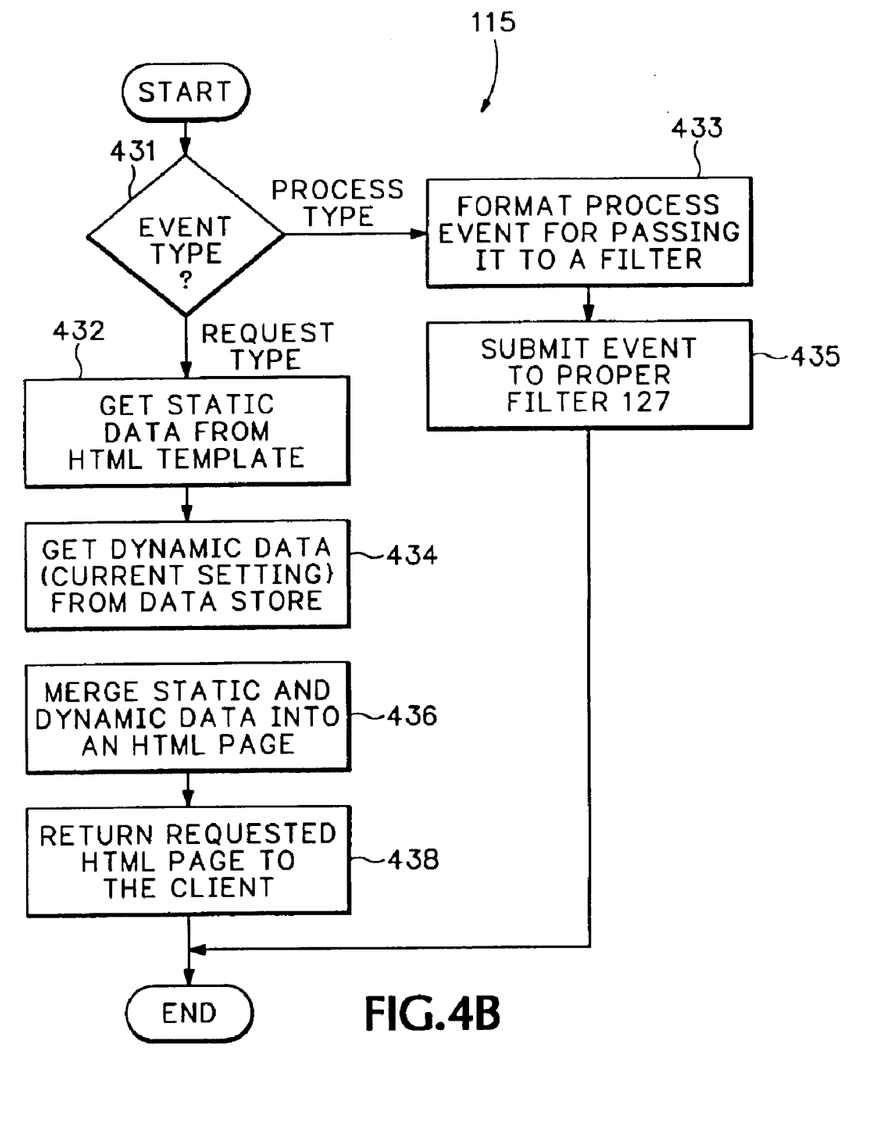

FIG. 4B is a flow chart depicting operations associated with the Remote Control CGI 115 component. HTML formatted data is received, step 431, form the Clients 111 via the Web Server 108 component which will include an indicator as to an event type, namely whether the current transaction is a "Request type"—defined as an initial call to a web page—or a "Process type"—defined as submitting filled in form, each shown as a separate flow path.

For a Process type operation, the RCCGI 115 component reformats the data, step 433, to the appropriate language and format for subsequent handling by the Filter 127 component as described hereinbefore. The data reformatting is undertaken, step 435, in a known manner associated with the language, e.g. C++, used in a specific implementation of the present invention.

For a Request type operation, the RCCGI 115 component first obtains the form, that is the static data of the HTML template, step 432. The Data Store 123 (FIG. 1) provides current settings—"dynamic data"—of the printer 105 from the Status Server 109, step 434. The form and dynamic data are merged into an HTML web page format, step 436, and returned, step 438, to the Client $111_1$.

EMH 125 Operations

Figure 4C:
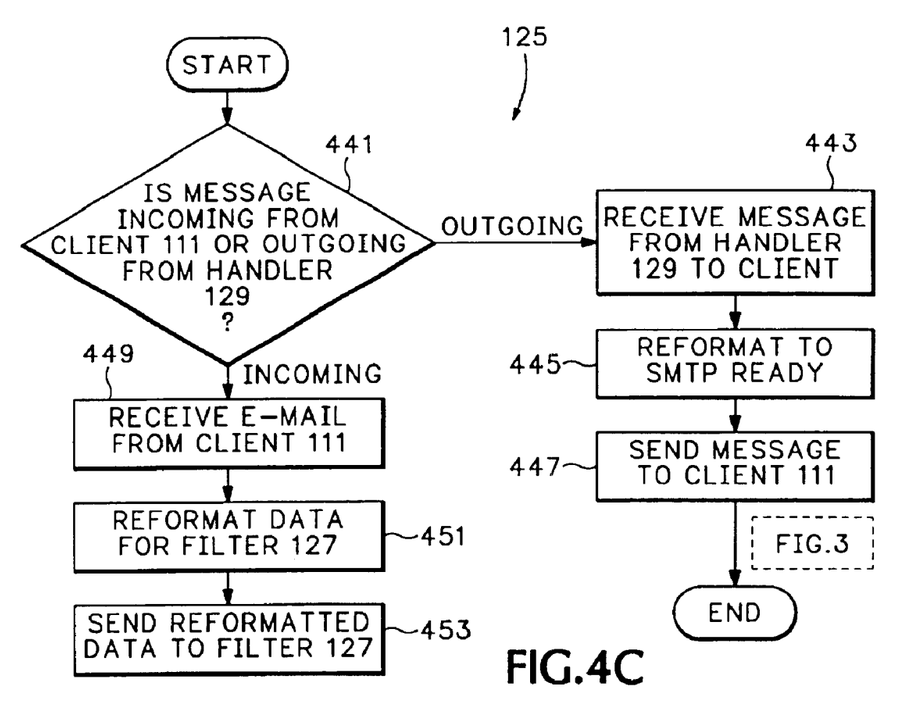

FIG. 4C is a flow chart depicting operations associated with the Electronic Mail Handler 125 component. As will be recalled from the foregoing description, the exemplary set of Clients$_{2-N}$ 111 are running e-mail applications 133 rather than a full web browser application 119 of the set of Client$_1$ 111 users. An e-mail, formatted, registration decipherable by the Filter 127 component can be provided to this type of non-browser associated end user Clients 111.

The EMH 125 component discriminates, step 441, as to whether an e-mail message is incoming to the Server 107 or outgoing from the Server 107. For example, as described above, certain Clients 111 may be registered to receive notification when a change in printer 105 operational characteristics changes. Following the "Outgoing" path of the flow chart of FIG. 4C, the EMH 125 component receives the message, step 443, from the Handler 129 component. In a known manner, the EMH 125 component reformats the message per SMTP, step 445. Depending on content and the data stored in the DSM 121 component —that is, as described hereinbefore, receiving continual printer operational state monitoring data from the Status Server 10 component—the EMH 125 component then addresses and transmits the reformatted message, step 447, as an e-mail to the appropriate registered (see FIG. 2) Clients 111. FIG. 3 illustrates an exemplary outgoing message from the EMH 125 component to predetermined—namely notification registered—Clients 111.

Following the "Incoming" path of the flow chart of FIG. 4C, an incoming message is received via a direct internet interface by the EMH 125 component, step 449. The incoming message is in an SMTP (or other industry standard) format. Therefore, the EMH 125 reformats the data to the appropriate language and format for handling by the Filter 127 component. The data reformatting is undertaken in a known manner associated with the language, e.g., C++, used in a specific implementation of the present invention. Once reformatted, the data is passed to the Filter 127 component.

Handlers 129 Operations

Figure 4D:
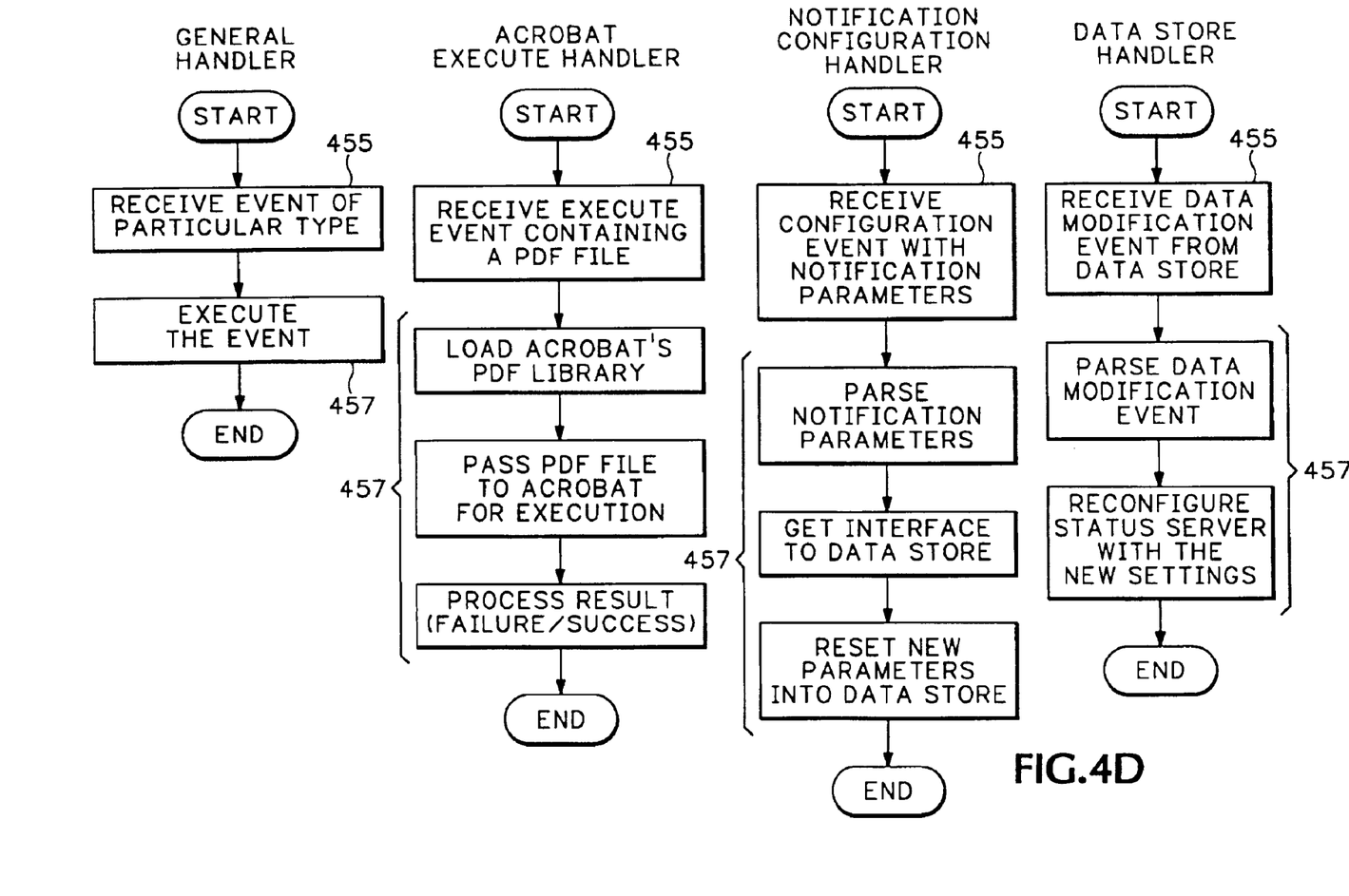

FIG. 4D are a set of flow charts depicting exemplary operations associated with the Handlers 129 component. Generally, the Handlers 129 component are routers designed to receive, step 455, and execute, step 457, specific requests based on header and data content of each. As specific examples, a specific handler subroutine—titled "Acrobat Execute Handler"—is provided to route a data set having a header indicating it is a print job to the Acrobat Reader 113 component; another specific handler subroutine—tilted "Notification Configuration Handler"—is built to interact with the DSM 121 component regarding printer operational characteristic states for e-mail notification to the Client 111, including responding to a "Device query over e-mail" (FIG. 1 web-balloon); another specific handler—tilted "Data Store Handler"—is provided to update the Status Server. Other specific Handlers are provided dependent upon the actual hardware and operations of the system 103 (FIG. 1).

Filter 127 Operations

Figures 4E, 4F:
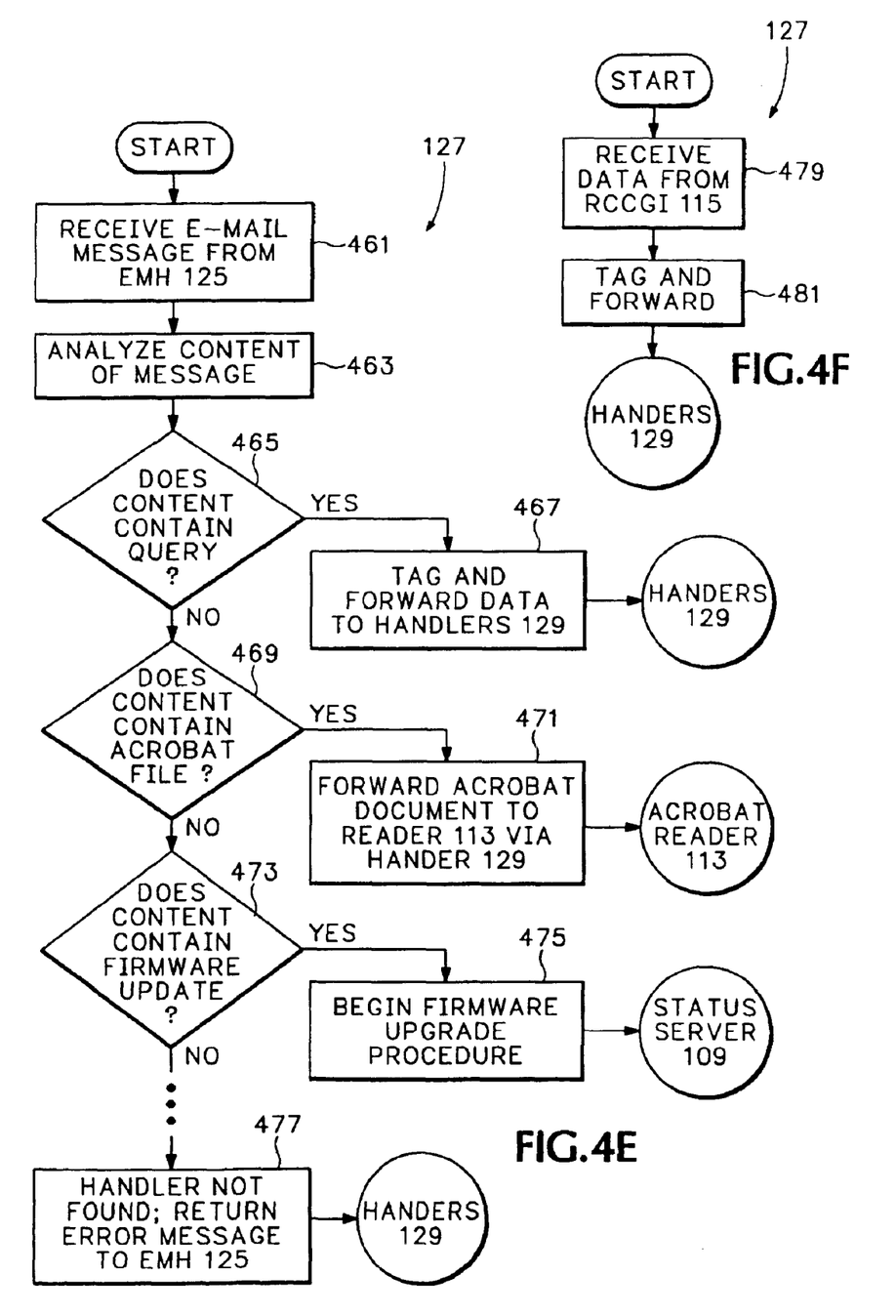

FIG. 4E is a flow chart depicting operations associated with the Filter 127 component in use in conjunction with the EMH 125 component. The EMH 125 component forwards messages to the filter 127 component as described hereinbefore (see FIG. 4C, step 453), now shown as step 461. The content of the message is analyzed, step 463. Examples of this analysis step follow as shown in the flow chart itself; it is not intended that this be an inclusive list as a specific implementation of the present invention may present a wide variety of data communications.

One decision, step 465, may be whether the e-mail message received contains a Client 111 query (see FIG. 1, web balloon "Device query over e-mail"). Note that specific formats for e-mail to permit queries, diagnostics, job tasks, and the like must be implemented in accordance with appropriate industry protocol standards or in a proprietary format by recognizing and transposing the industry protocol standards. For example, a Client 111$_N$ may wish to known what the current printer queue is before sending a print job. The query is tagged as such and forwarded to the Handlers 129 component, step 467.

Another decision, step 469, may be whether an Acrobat print job is attached to the e-mail message. If so, 469 YES-path, the document is routed via the Handlers 129 to the Acrobat Reader 113 component for printing.

Still another exemplary decision, step 473, may be whether a maintenance type firmware upgrade is being sent by a system administrator type Client 111. The Handlers 129 component subroutine can be designed to recognize such as message (subject to suitable security procedures) and begin a firmware upgrade procedure, step 475, via the Status Server component 109.

FIG. 4F is a flow chart for the Filter 127 component where a browser 119 based client sends an HTML submission to the RCCGI 115 component via the Web Server 108 Component. Again, the Filter 127 component is required to receive data from the RCCGI 115 component, step 470, recognize the format and appropriately tag the message, forwarding it to the Handlers 129 component, step 481. Assuming the Handlers 129 component has the appropriate subroutine for routing the specific data, it does so; otherwise, an error message can be returned to the Client 111 (for example, a typical browser 119 pop-up window explaining the "Server was not found").

Again, a specific implementation of the present invention can provide for other Handlers 129 component subroutines (represented symbolically in FIG. 4E by ". . . ").

When no appropriate Handlers 129 components subroutine is found to match an e-mail message, step 477, an error messages is generated and forwarded to the EMH 125 component via a Handlers 129 component outgoing e-mail subroutine.

In summary, the present invention provides a method and apparatus for subscribed clients outside a network firewall to query, diagnose, configure, and control a computer peripheral such as a hard copy apparatus from outside the firewall using predetermined web based browser interface applications provided or using electronic mail using predetermined format electronic mail messages. A dedicated status subserver is provided to permit substantially simultaneous communication with a multiplicity of such clients.

The foregoing description of the preferred embodiment of the present invention has been presented for purposes of illustration and description. It is not intended to be exhaustive or to limit the invention to the precise form or to exemplary embodiments disclosed. Many modifications and variations will be apparent to practitioners skilled in this art. Similarly, any process steps described might be interchangeable with other steps in order to achieve the same result. The disclosed embodiment was chosen and described in order to best explain the principles of the invention and its best mode practical or preferred application, thereby to enable others skilled in the art to understand the invention for various embodiments and with various modifications as are suited to the particular use or implementation contemplated. It is intended that the scope of the invention be defined by the following claims and there equivalents. Reference to an element in the singular is not intended to mean "one and only one" unless explicitly so stated, but can mean "one or more." Moreover, no element, component, nor method step in the present disclosure is intended to be dedicated to the public regardless of whether the element, component, or method step is explicitly recited in the claims. No claim element herein is to be construed under the provisions of 35 U.S.C. Sec. 112, sixth paragraph, unless the element is expressly recited using the phrase "means for . . . "

What is claimed is:

1. A server for hard copy apparatus control comprising:

means for connecting the apparatus to a network;

means for deciphering messages received via the means for connecting to determine if the message is a process type message or a request type message;

means for routing deciphered messages received via the means for deciphering such that process and request type messages are discriminatively routed; and means for respectively receiving discriminatively routed messages; and means for executing tasks corresponding to discriminatively routed messages a web server component having means for providing web-based clients with an HTML interface application compatible therewith and having means for thereafter communicating with each of the web based clients via the HTML interface application;

means for generating requested HTML pages dynamically from provided predetermined templates and current status information related to the hard copy apparatus in response to request type messages and means for processing web-based client input to the pages in response to process type messages.

2. The server as set forth in claim 1, the means for connecting the apparatus to a network comprising:

an electronic mail handler component including means for automatically sending electronic mail to subscribed clients based upon hard copy apparatus status changes.

3. The server as set forth in claim 1, wherein:

the HTML pages are interactive pages from the templates enabling the clients to specify electronic mail server settings and to configure notification events.

4. The server as set forth in claim 3, wherein:

the interactive pages enable the clients to specify new configurations for subcomponents of the means for deciphering messages.

5. The server as set forth in claim 4, wherein:

the new configurations are submitted for processing to the means for deciphering messages such that hard copy apparatus diagnostic subroutines employed do actual reconfiguration of the hard copy apparatus.

6. The server as set forth in claim 1, the means for deciphering messages comprising:

means for filtering an in-coming client message based on header data content.

7. The server as set forth in claim 6, the means for routing deciphered messages comprising:

means for receiving filtered electronic mail messages and providing appropriate interaction with components of the server subsystem by examining the content described by an associated header of the message and acting on it.

8. The server as set forth in claim 1, the means for executing the tasks comprising:

means for abstracting hard copy apparatus operational states;

means for print job controlling;

interfaced with said means for abstracting, means for data storage managing; and means for data storage.

9. The server as set forth in claim 8, wherein:

the means for connecting the apparatus to a network comprises an electronic mail handler component invokable by the means for data storage managing for automatically sending an electronic mail to subscribed clients based upon hard copy apparatus operational state changes abstracted by the means for abstracting.

10. The server as set forth in claim 8, wherein:

the means for abstracting comprises a status subserver component including a portal with the hard copy apparatus for transmitting data representing each operational state in a client-server model.

11. The server as set forth in claim 10, the status subserver component comprising:

means for transposing hard copy apparatus device specific language into a language for use by other server components.

12. The server as set forth in claim 10, the status subserver component comprising:

a virtual multiplexer for permitting and managing data such that a plurality of clients can communicate substantially simultaneously with the hard copy apparatus.

13. The server as set forth in claim 8, the means for data storage managing comprising:

a COM executable server subcomponent for saving and retrieving electronic mail and hard copy apparatus operational state notification settings.

14. The server as set forth in claim 9, the means for data storage managing comprising:

subcomponents for registering with the status subserver component for predetermined hard copy apparatus operational state change notification events.

15. The server as set forth in claim 14, further comprising:

when at least one of the events occurs, the status subserver is configured to provides a call back into the means for data storage managing which then takes appropriate action pursuant to client registration configurations by sending associated electronic mail to all subscriber clients registered for providing notification of the events.

16. The server as set forth in claim 1, the HTML interface application further comprising:

hyperlinks to a website that leads to web pages that point to the means for generating requested HTML pages.

17. The server as set forth in claim 16, comprising:

means for generating requested HTML pages that loads an HTML file containing the predetermined template for the requested HTML page and merges it with current settings corresponding to the hard copy apparatus resulting in an HTML page containing current hard copy apparatus settings that is returned to a requesting client.

18. The hard copy apparatus of claim 1, having reportable operational state conditions, comprising:

an embedded server including computer code for providing an internet interface;

computer code for handling incoming electronic mail and outgoing electronic mail;

computer code for deciphering messages received via the computer code for providing internet interface and messages received via the computer code for handling incoming electronic mail to determine if a given message is a process type message or a request type message;

computer code for routing messages from the computer code for deciphering types of messages such that the process and request type messages are discriminatively routed; and computer code for processing messages routed by the computer code for routing messages such that the hard copy apparatus printing mechanisms can be controlled according to process type messages and the reportable operational state conditions can be monitored according to request type messages.

19. The apparatus as set forth in claim 18 comprising:

the computer code for providing internet interface is compatible with a dedicated HTML user interface residing on a remote browser outside a network firewall protecting access to the apparatus.

20. The apparatus as set forth in claim 19 wherein the computer code for processing messages comprises:

computer code for generating requested interactive HTML pages dynamically from provided predetermined templates on-board the apparatus according to request type messages and computer code for processing web-based client input from the interactive HTML pages according to process type messages.

21. The apparatus as set forth in claim 20 wherein:

the templates include computer code for reporting apparatus current operational status.

22. The apparatus as set forth in claim 20 wherein:

the templates include computer code for controlling apparatus functionality.

23. The apparatus as set forth in claim 18 comprising:

computer code for automatically generating and dispatching electronic mail messages indicative of the apparatus current operational states to a client outside a network firewall protecting the apparatus.

24. The apparatus as set forth in claim 18 wherein:

the computer code for processing messages includes computer code for setting apparatus configuration according to an electronic mail process type message.

25. The apparatus as set forth in claim 18 wherein:

the computer code for processing messages includes computer code for performing apparatus diagnostics according to an electronic mail request type message.

26. The apparatus as set forth in claim 18 wherein:

the computer code for processing messages includes computer code for performing apparatus hard copy printing operation according to an electronic mail process type message.

27. The apparatus as set forth in claim 18 wherein:

the computer code for processing messages includes computer code for responding to device status queries made in an electronic mail request type message.

* * * * *

UNITED STATES PATENT AND TRADEMARK OFFICE
CERTIFICATE OF CORRECTION

| | |
|---|---|
| PATENT NO. | : 6,931,447 B1 |
| APPLICATION NO. | : 09/671556 |
| DATED | : August 16, 2005 |
| INVENTOR(S) | : Charles H. Hemstreet et al. |

It is certified that error appears in the above-identified patent and that said Letters Patent is hereby corrected as shown below:

Column 1, line 15, delete "there" and insert therefor --these--

Column 3, line 1, after "URL" delete "to"

Column 3, line 11, delete "servers" and insert therefor --serves--

Column 3, line 31, before "world" insert --"--

Column 8, line 38, delete "nay" and insert therefore --any--

Column 12, line 5, delete "known" and insert therefor --know--

Column 12, line 64, delete "there" and insert therefor --their--

Column 14, Claim 15, line 40, delete "provides" and insert therefor --provide--

Column 14, Claim 15, line 45, delete "events" and insert therefor --event--

Signed and Sealed this

Twelfth Day of December, 2006

JON W. DUDAS
*Director of the United States Patent and Trademark Office*